(12) United States Patent
Vidal et al.

(10) Patent No.: US 12,191,914 B2
(45) Date of Patent: *Jan. 7, 2025

(54) INTRA DATA CENTER OPTICAL COMMUNICATION (71) Applicant: Solanium Labs Ltd., Hod Hasharon (IL)

(72) Inventors: Or Vidal, Hod Hasharon (IL); Omri Levy, Hod Hasharon (IL); Nir Chen Sheffi, Hod Hasharon (IL)

(73) Assignee: Solanium Labs Ltd., Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,373

(22) Filed: Jun. 16, 2022

(65) Prior Publication Data

US 2022/0393770 A1 Dec. 8, 2022

Related U.S. Application Data (63) Continuation of application No. 17/477,518, filed on Sep. 16, 2021, now Pat. No. 11,398,868.

(60) Provisional application No. 63/195,089, filed on May 31, 2021.

(51) Int. Cl.
*H04B 10/61* (2013.01)
*H04B 10/25* (2013.01)
*H04B 10/50* (2013.01)
*H04J 14/02* (2006.01)
*H04L 5/00* (2006.01)

(52) U.S. Cl.
CPC .......... *H04B 10/61* (2013.01); *H04B 10/505* (2013.01); *H04L 5/0048* (2013.01); *H04B 10/25* (2013.01); *H04J 14/02* (2013.01)

(58) Field of Classification Search
CPC .... H04B 10/61; H04B 10/516; H04B 10/505; H04B 10/25; H04B 10/50; H04B 10/504; H04B 10/572; H04B 10/564; H04B 10/40; H04B 10/60; H04B 10/0795; H04B 10/58; H04L 5/0048; H04J 14/02
See application file for complete search history.

(56) References Cited

U.S. PATENT DOCUMENTS

5,367,397 A   11/1994  Tajima
10,979,148 B1 * 4/2021  Zhou .................... H04B 10/612
11,036,014 B1 * 6/2021  Seyedi .................... G02B 6/34
(Continued)

*Primary Examiner* — Hibret A Woldekidan
(74) *Attorney, Agent, or Firm* — Reches Patents (57) ABSTRACT A system, a non-transitory computer readable media and a method for intra data center optical communication, the method may include (a) receiving an optical input signal by a coherent optical receiver of a second unit of a data center; wherein each input optical signal represents a transmitted optical signal that was transmitted by a coherent transmitter of a first unit of the data center; wherein the transmitted optical signal is generated by modulating a transmitter laser signal that is outputted from a laser of the coherent transmitter; (b) generating, by a controllable laser of the coherent optical receiver, a reference signal; wherein a frequency of the reference signal is controlled by a processor of the coherent optical receiver; and (c) recovering data embedded in the optical input signal; wherein the recovering of the data comprises optically processing the reference signal and the optical input signal.

7 Claims, 8 Drawing Sheets (56) References Cited

U.S. PATENT DOCUMENTS

| | | | |
|---|---|---|---|
| 2005/0185684 A1* | 8/2005 | Stewart | H04B 10/503 372/29.02 |
| 2009/0142051 A1* | 6/2009 | Shpantzer | G02B 6/12007 398/25 |
| 2011/0188866 A1* | 8/2011 | Maeda | H04B 10/6164 398/202 |
| 2014/0063592 A1* | 3/2014 | Ip | H01S 3/06754 359/337.1 |
| 2016/0269122 A1* | 9/2016 | Yu | H04B 10/90 |
| 2018/0123720 A1* | 5/2018 | Nomura | G02B 6/42 |
| 2019/0296824 A1 | 9/2019 | Woodside et al. | |

* cited by examiner

Receiving an optical input signal by a coherent optical receiver of a second unit of a data center. The input optical signal represents a transmitted optical signal that was transmitted by a coherent transmitter of a first unit of the data center. The transmitted optical signal is generated by modulating a transmitter laser signal that is outputted from a laser of the coherent transmitter. The modulation embeds data in the transmitted data. 110

Generating, by a controllable laser of the coherent optical receiver, a reference signal 120

Recovering data embedded in the optical input signal 130

Controlling the frequency of the reference signal by a digital decision unit 140

Receiving an optical input signal by a coherent optical receiver. The
input optical signal represents a transmitted optical signal
that was transmitted by a coherent transmitter of a first unit.
The transmitted optical signal is generated
by modulating a transmitter laser signal that is outputted from
a laser (such as a non-tunable laser) of the coherent transmitter. The
modulation embeds data in the transmitted data. 111

↓

Generating, by a controllable laser of the coherent optical receiver, a
reference signal 120

↓

Recovering data embedded in the optical input signal 130

Controlling the frequency of the reference signal by a digital decision
unit 140

INTRA DATA CENTER OPTICAL COMMUNICATION

BACKGROUND

Data centers are regarded as essential components of the Internet and of could computing. The volume of traffic between data centers has a dramatically grown during the last couple of years.

Some data centers communicate with each other using a non-coherent optical communication scheme. The non-coherent optical communication scheme has various drawbacks such as an inferior sensitivity and a higher susceptibility to spectral noises—in relation to coherent optical communication schemes.

Some vendors suggest using coherent optical communication schemes. For example—PACKETLIGHT NETWORKS INC. suggest using a coherent optical communication scheme known as Dense Wavelength Division Multiplexing (DWDM).

DWDM requires a transmission of several wavelengths over a single optical fiber, with a spacing of 0.8 nanometer between adjacent wavelengths.

DWDM requires a transmitter that includes a tunable laser is costly, powerful, configured to transmit over a very wide range of wavelengths (including the several wavelengths mentioned above), and to maintain wavelength stability and accuracy across a wide range of temperatures. A sinusoidal signal that is outputted by the tunable laser is utilized by a front end circuit of the transmitter and by the receiver.

An example of a DWDM based communication interface is the Digital Coherent 400ZR interface illustrated in "OIF Implementation Agreement 400ZR" OFI-400ZR-01.1, Mar. 10, 2020 (www.oiforum.com/wp-content/uploads/OIF-400ZR-01.0_reduced2.pdf). The Digital Coherent 400ZR interface requires the tunable laser to maintain frequency accuracy of +1.8 GHz.

The Digital Coherent 400ZR interface also requires a relatively complex forward error correction (FEC) scheme that has about 14.8 percent overhead.

DWDM are fitted to communication between data centers but is too costly for intra data center communication.

There is a growing need to provide an efficient method for intra datacenter optical communication that is less costly that DWDM and does not suffer from the drawbacks of noncoherent optical communication.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a method, a system, and a computer readable medium for coherent communication—including intra data center communication.

Figure 1:
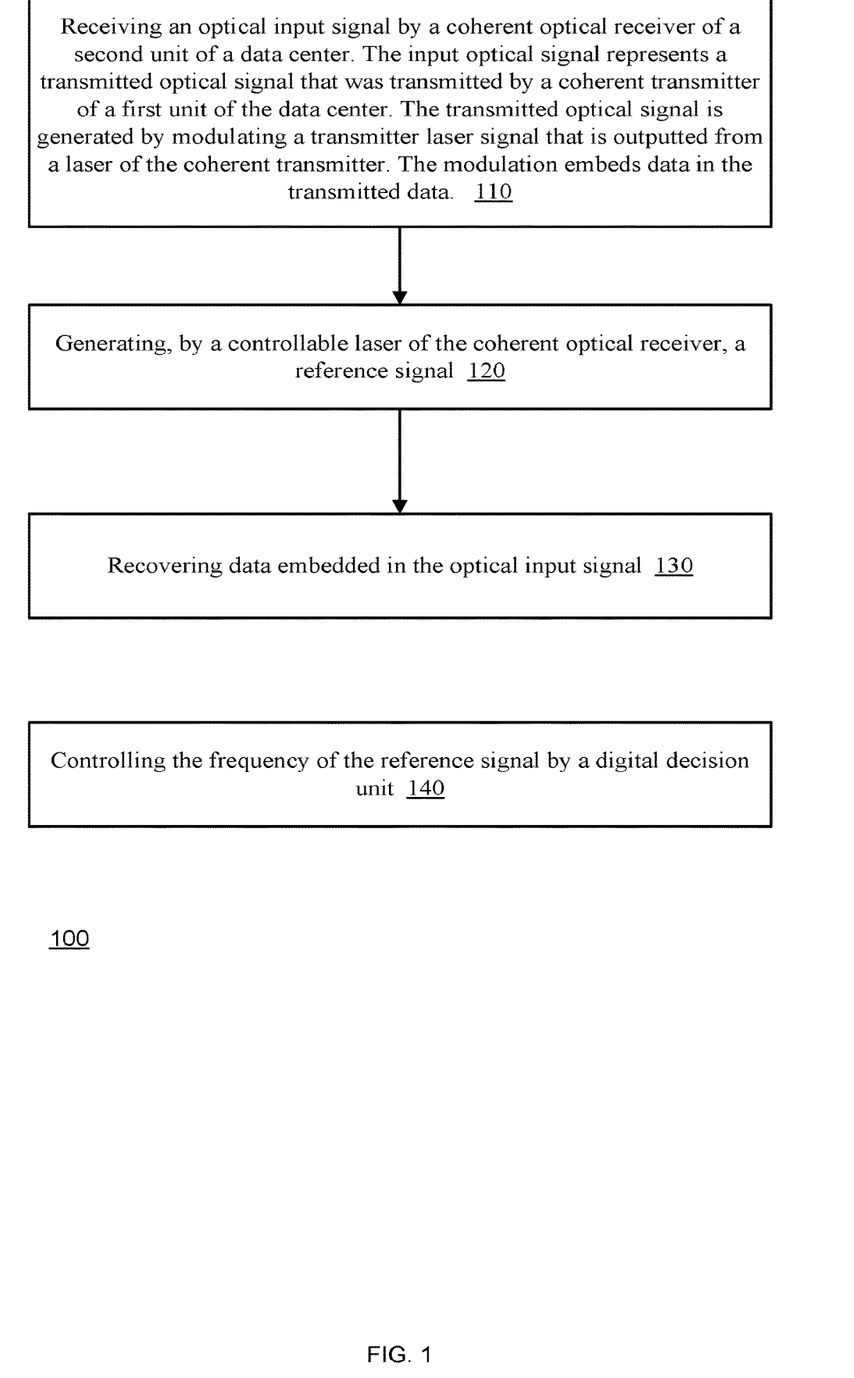
FIG. 1 is an example of a method.

FIG. 1 illustrates an example of method 100 for intra data center optical communication.

Method 100 may start by step 110 of receiving an optical input signal by a coherent optical receiver of a second unit of a data center.

The input optical signal represents a transmitted optical signal that was transmitted by a coherent transmitter of a first unit of the data center. The term "represents" indicates that the transmitted optical signal may have changed by a channel between the coherent transmitter and the coherent receiver. The channel may include an optical fiber but may include other components.

The first unit and the second unit may be network elements such as a switch, a router, a gateway, and a server.

The transmitted optical signal is generated by modulating a transmitter laser signal that is outputted from a laser of the coherent transmitter. The modulation embeds data in the transmitted data.

The transmitted data may include a forward error correction code that can be much simpler—using shorter codewords that those of 400ZR—thereby reducing transmission latency and reception latency.

The input signal may be Coarse Wavelength Division Multiplexing (CWDM) compliant. The receiver may receive multiple input signals over different wavelengths—and each of the input signals may be processed separately—for example after being separated from each other by an optical demultiplexer.

The input optical signal may be Parallel Single mode Fiber (PSM) compliant.

The input signal may be compliant to an optical protocol that is simpler than DWDM.

The coherent transmitter may be a dual polarization coherent transmitter that embeds data in different polarizations—for example two polarizations—for example two polarizations that are orthogonal to each other—any may convey provide in-phase (I) modulated data and quadrature (Q) modulated data. Other polarizations schemes (number of polarizations, other angles between polarizations) and/or other modulation (differ from I and Q modulations) may be provided.

The coherent transmitter may include a tunable laser—but method 100 may operate when the coherent transmitter include a much cheaper non-tunable laser—thereby dramatically reducing the cost of the coherent transmitter. For example—the cost difference between the tunable laser and a non-tunable laser may exceed a factor of 2, 10, 20, 50, 100 and the like.

Step 110 may be followed by step 120 of generating, by a controllable laser of the coherent optical receiver, a reference signal. The reference signals may also be referred to as a local oscillator signal.

The frequency of the reference signal is controlled by a processor of the coherent optical receiver.

The controllable laser may be a laser that may fulfill at least one of the following:

May be much cheaper than a tunable laser.

May not exhibit frequency stability over time—or at least be less stable (over time) than a tunable laser.

May not exhibit frequency stability over temperature change—or at least is less stable (over temperature changes) than a tunable laser.

May be much less accurate that a tunable laser.

May be controlled by a relative frequency control scheme that may indicate whether the frequency of the controllable laser should be increased or decreased.

May output a reference signal that has a power that is lower (and even much lower) than a power of the transmitter laser signal.

May output low power signals—for example may output 9 dBm signals.

May be configured to output any frequency within the frequency range.

May exhibit a continuous drift of wavelength across temperature.

May be required to output a signal within a relatively limited range in relation to a DWDM laser—for example may output a signal within a range of a single CWDM link—while the tunable laser that is CWDM compliant has to output a signal within the entire C band.

Has a wavelength accuracy versus a target frequency (at power up and/or following power up) that can be relaxed in relation to the wavelength accuracy versus a target frequency of a tunable laser that is CWDM compliant—for example ±10 nanometers versus ±3.5 GHz (at power up) and ±2.5 GHz (at power up) following power up of the tunable laser that is CWDM compliant.

Step 120 may be followed by step 130 of recovering data embedded in the optical input signal.

Step 130 may include:
(a) Optically processing the reference signal (Sr(t)) and the optical input signal (Sin(t)).
(b) Converting the light outputted from the optical processing to an analog signal.
(c) Analog to digital conversion.
(d) Digital processing.

Steps (a) and (b) may include:
(i) Feeding the reference signal and the optical input signal to polarization beam splitter that splits the input signal to a first polarization signal and a second polarization signal (the first and second polarizations may be orthogonal to each other).
(ii) Splitting the first polarization signal to a first in-quadrature signal and to a first quadrature signal, and splitting the second polarization signal to a second in-quadrature signal, and to a second quadrature signal.
(iii) Analog to digital converting the first in-quadrature signal, the first quadrature signal, the second in-quadrature signal, and the second quadrature signal to digital signals.
(iv) Processing the digital signals.

The digital processing may include extracting the in-phase modulated data and the quadrature modulated data.

The recovering of data may include and/or may be followed and/or may be preceded by any operation related to coherent detection—for example clock recovery, error correction, and the like.

Method 100 may include step 140 of controlling the frequency of the reference signal by the processor.

Step 140 may include at least one out of:

Sending control commands selected out of increase frequency, decrease frequency and may also command to maintain the current frequency.

Avoiding from requesting an absolute output frequency of the controlled laser.

Controlling a temperature of the controllable laser.

Sending a bias signal to the controllable laser.

Operate over a narrow frequency band in relation to DWDM.

Allowing the signal of the controllable laser to deviate from the frequency of the input signal.

Applying any frequency estimation and/or control scheme—for example applying the Viterbi-Viterbi fourth power estimator algorithm.

The coherent optical receiver may be included in a pluggable communication unit or may be included in a non-pluggable communication unit.

While method 100 referred to a transmission from a coherent transmitter of a second unit to a coherent receiver of a first unit—it should be noted that the first unit may include a coherent transmitter and the second unit may include a coherent receiver. Furthermore—each of the first unit and the second unit may communicate with other units of the data center. Method 100 may be applied mutatis mutandis on such communications.

It should be noted that one or more receivers and one or more transmitters of a same unit may be included in a single transceiver integrated circuit.

It should be noted that while method 100 referred to intra data center communication—method 100 may be applied mutatis mutandis to communications between units that do not belong to a data center. An example of such a method is illustrated in FIG. 2.

Figure 2:
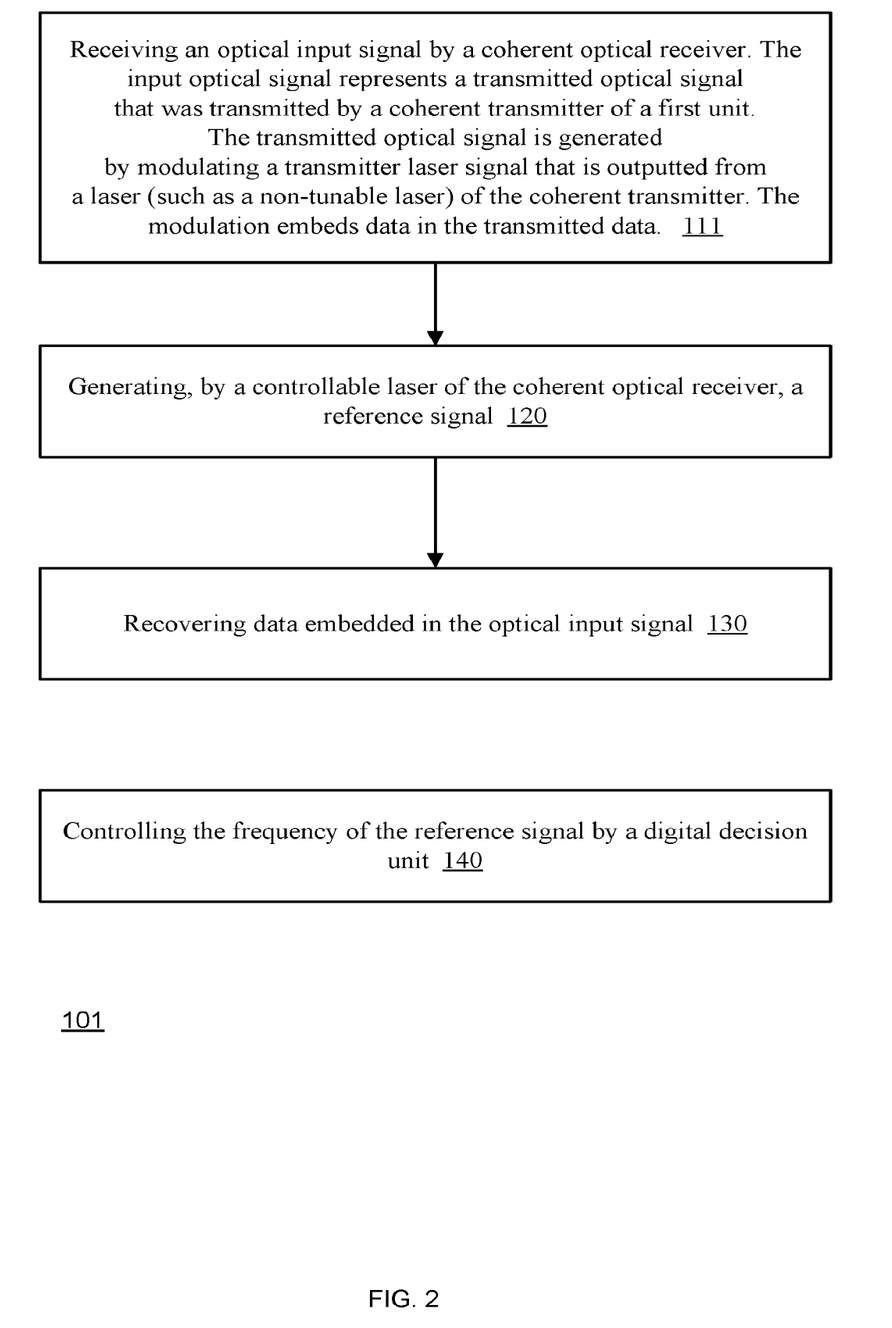
FIG. 2 is an example of a method.

FIG. 2 illustrates an example of method 101.

Method 101 may start by step 111 of receiving an optical input signal by a coherent optical receiver. The input optical signal may represent a transmitted optical signal that was transmitted by a coherent transmitter of a first unit.

The transmitted optical signal is generated by modulating a transmitter laser signal that is outputted from a laser (such as a non-tunable laser) of the coherent transmitter. The modulation embeds data in the transmitted data.

Method 101 may be followed by step 120. Step 120 may be followed by step 130. Method 101 may also include step 140.

Figure 3:
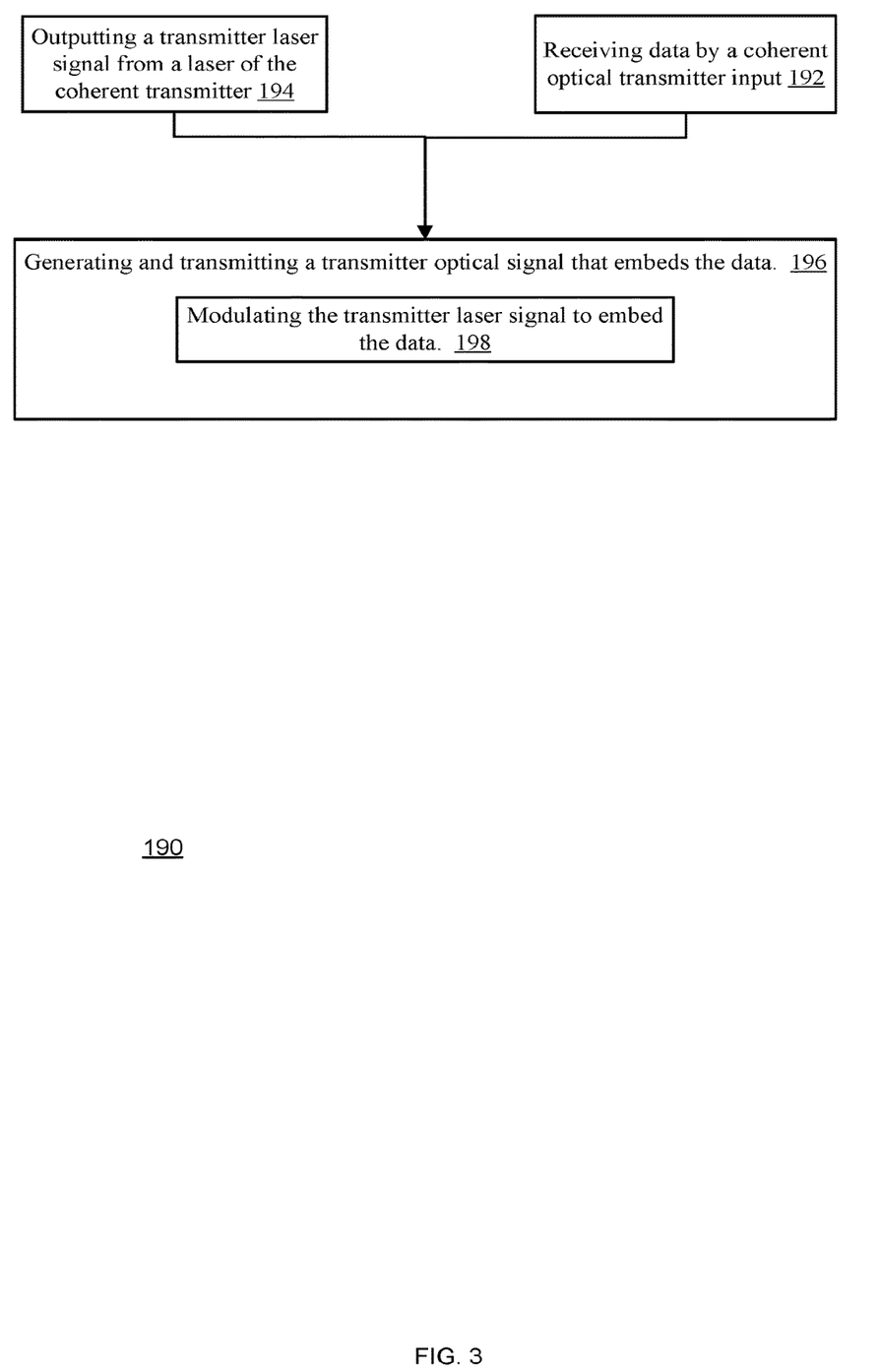
FIG. 3 is an example of a method.

FIG. 3 is an example of method 190 for transmitting a transmitter optical laser signal.

Method 190 may start by steps 192 and 194.

Step 192 may include receiving data by a coherent optical transmitter input. The data may be included in one or more data streams.

Step 194 may include outputting a transmitter laser signal from a laser of the coherent transmitter.

Steps 192 and 194 may be followed by step 196 of generating and transmitting a transmitter optical signal that embeds the data. Step 196 may include step 198 of modulating the transmitter laser signal to embed the data.

Figure 4:
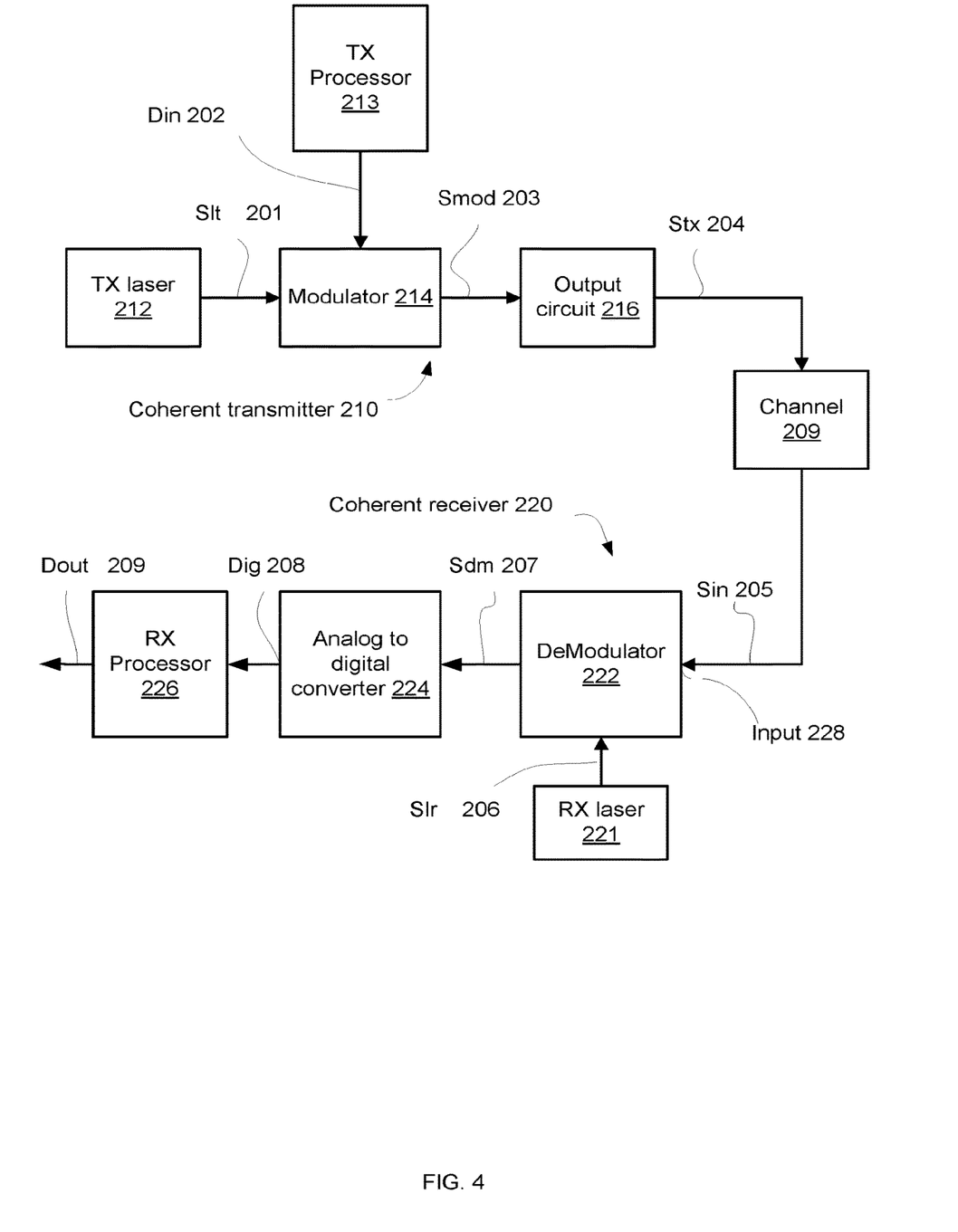
FIG. 4 is an example of a coherent transmitter, a channel and a coherent receiver.

FIG. 4 illustrates an example of a coherent transmitter 210, a channel 209, and a coherent receiver 220.

The coherent transmitter 210 includes a laser of the coherent transmitter (denoted "TX laser") 212, a transmitter processor (denoted "TX processor") 213, a modulator 214, and an output circuit 216.

The laser of the coherent transmitter (denoted "TX laser") 212 is configured to output a transmitter laser signal (Slt 201). The receiver processor (denoted "RX processor") 213 is configured to send data (Din 202) to the modulator 214. The modulator 214 is configured to modulates the transmitter laser signal according to the data to provide a modulated optical signal (Smod 203). The modulated optical signal is either outputted to channel 209 or is fed to the output circuit 216. The output circuit 216 may output the transmitted optical signal (Stx 204) to channel 209. The output circuit may be a polarization beam combiner or any circuits that performs any optical processing and/or interfacing (to channel) operation.

The coherent receiver 220 includes an input 228 that is configured to receive an optical input signal (Sin 205) and additional coherent receiver components that are configured to perform optical processing, analog to digital conversion and digital processing for extracting the data from the optical input signal.

In FIG. 4 the additional coherent receiver components include a receiver processor (denoted "RX processor") 226, a controllable laser (denoted "RX laser") 221 for generating a reference signal (Slr) 206 under the control of the processor and optical circuitry that is configured to optically process the reference signal and the optical input signal (for example—demodulator 222 that outputs demodulator output signal (Sdm 207)), and an optical to digital conversion circuitry such as analog to digital converter 224.

The receiver processor is also configured to recover data embedded in the optical input signal.

Figure 5:
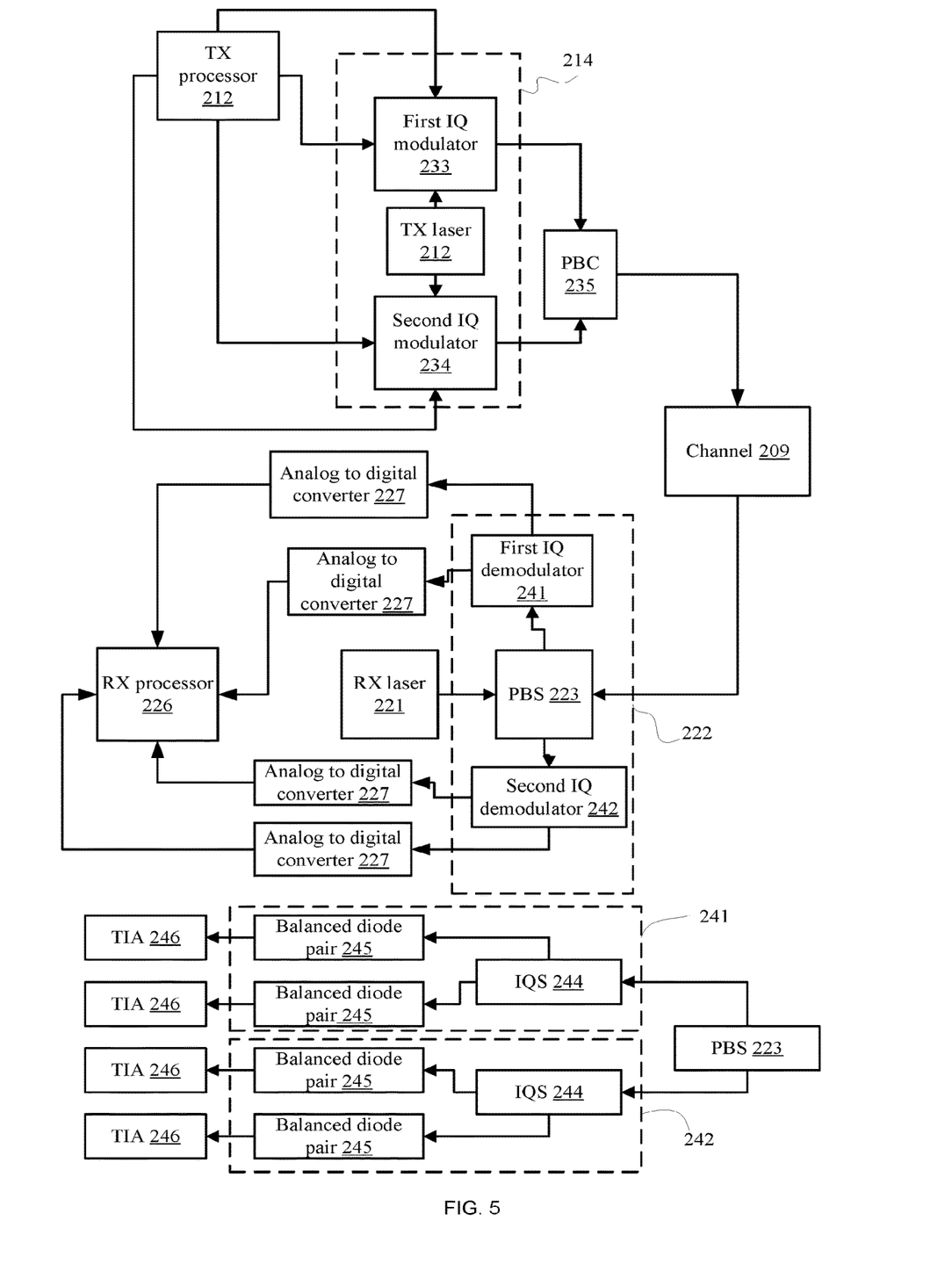
FIG. 5 is an example of a coherent transmitter, a channel and a coherent receiver.

FIG. 5 illustrates an example of a coherent transmitter 210, a channel 209, and a coherent receiver 220.

The modulator 214 includes a first IQ modulator 233, a second IQ modulator 234—both are fed by TX laser 212 and both are controlled by TX processor 213. The output circuit is a polarization beam combiner (denoted "PBC") 235.

The demodulator 222 includes a first IQ demodulator 241, a second IQ demodulator 242, and a polarizing beam splitter (PBS) 223. PBS 223 is fed by RX laser 221 and by the input signal from channel 209. The first and second IQ demodulators are followed by four analog to digital converters 227 that output digital signals to RX processor 226.

An example of a demodulator and analog to digital converters is also illustrated in FIG. 5.

PBS 223 outputs to output signals to I-Q separation units (denoted "IQS") 224. The two I-Q separation units are followed by four balanced diode pairs—for outputting two in-phase signals and two quadrature signals—that are fed to analog to digital converters such as transimpedance amplifiers (denoted "TIA") 246.

Figure 6:
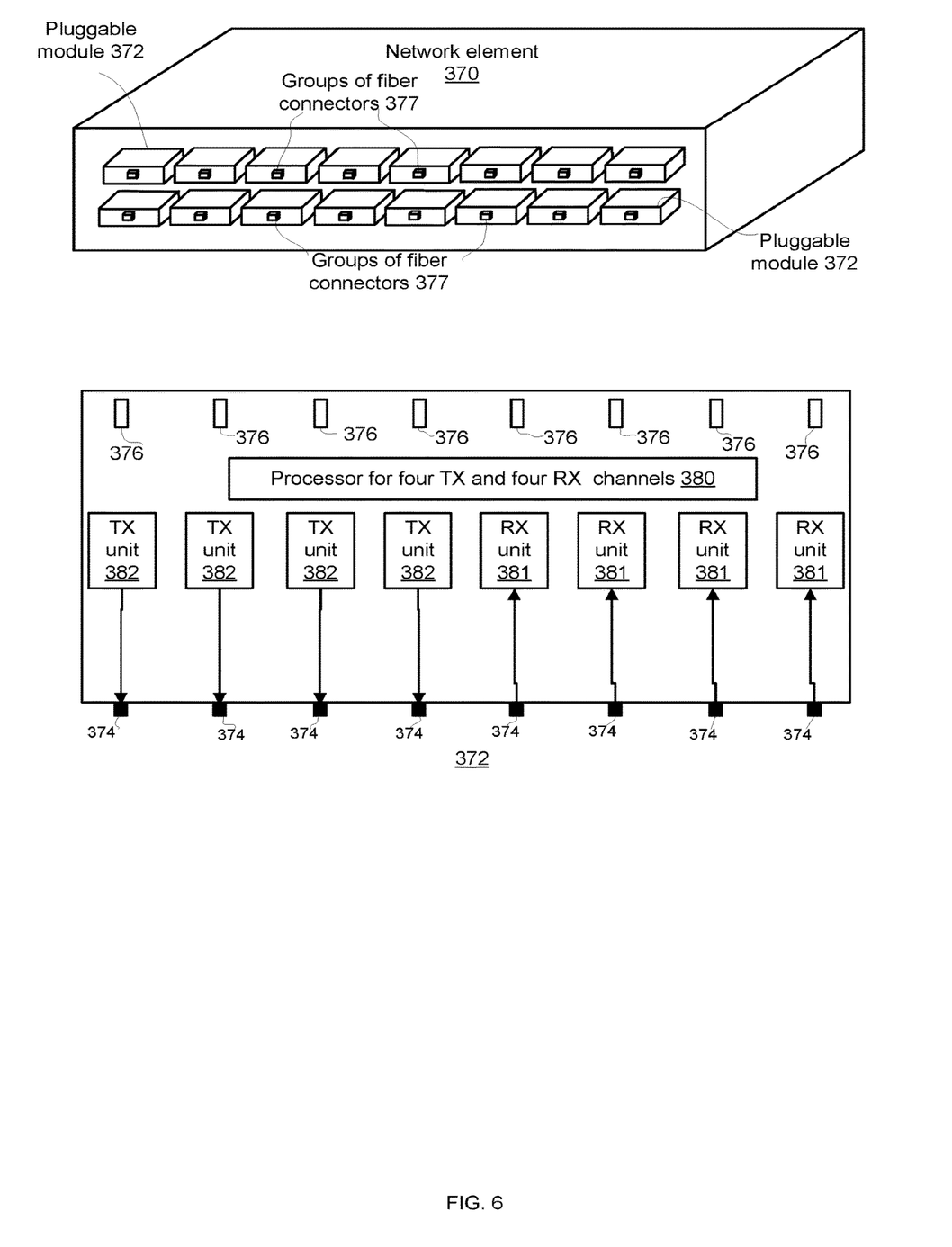
FIG. 6 is an example of a network element and one or more pluggable modules.

FIG. 6 illustrates an example of a pluggable module 372 and an example of an exterior of a network element 370 with sixteen pluggable modules 372. Each pluggable module includes eight fiber connectors 374. The eight fiber connectors may form a group of fiber connectors 377.

Figure 7:
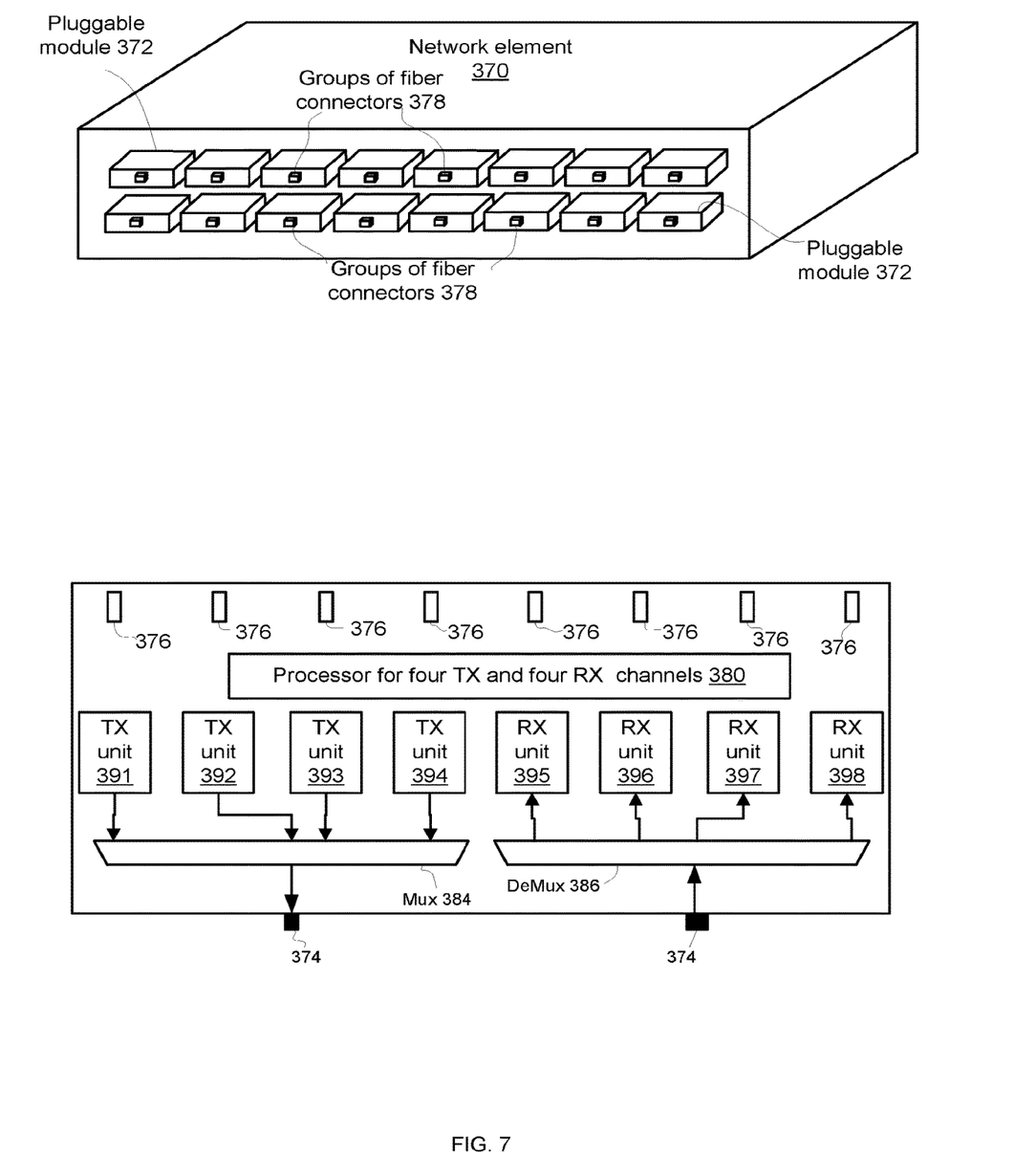
FIG. 7 is an example of a network element and one or more pluggable modules.

The number of fiber connectors per pluggable module and/or the number of pluggable modules per network element and/or the number of fiber connectors per group of fiber connectors may differ from those illustrated in FIGS. 6 and 7.

Each pluggable module 372 includes four coherent transmitters and four coherent receivers—of the same color—and the transmission over the optical fibers may be Parallel Single mode Fiber (PSM) compliant.

The four coherent transmitters and the four coherent receivers may share a processor (denoted "processor for four Tx and four RX channels") 380. The four coherent transmitters may also include four coherent transmission units (each coherent transmission unit is denoted "TX unit" 282). The four coherent receivers may also include four coherent reception units (each coherent reception unit is denoted "RX unit" 281). The four coherent transmission units and the four coherent reception units may be optically coupled to the eight fiber connectors 374.

Any transmission unit may include components other than the transmitter processor—for example—a laser of the coherent transmitter, a modulator and the like.

Any reception unit may include components other than the receiver processor—for example—a controllable laser, a demodulator and the like.

The pluggable module 372 also include electrical connectors 376 for interfacing with other components of the network element 370. The electrical connectors 376 may exchange signals with the processor for four Tx and four RX channels 380.

FIG. 7 illustrates an example of a pluggable module 372 and an example of an exterior of a network element 370 with sixteen pluggable modules 372. Each pluggable module includes two fiber connectors 374. The two fiber connectors may form a group of fiber connectors 378.

The pluggable module 372 includes four coherent transmitters and four coherent receivers—that for four pairs of a receiver and a transmitter—whereas different pairs of the four pairs operate at four different wavelengths—that may be Coarse Wavelength Division Multiplexing (CWDM) compliant.

The four coherent transmitters and four coherent receivers may share a processor (denoted "processor for four Tx and four RX channels") 380. The four coherent transmitters may also include four coherent transmission units (each coherent transmission unit is denoted "TX unit" 282). The four coherent receivers may also include four coherent reception units (each coherent reception unit is denoted "RX unit" 281).

The four coherent transmission units are optically coupled to a multiplexer (denoted "Mux") 384 having an output coupled to a fiber connector 374.

Another fiber connector 374 is optically coupled to a demultiplexer (denoted "DeMux" 386) that is optically coupled to input of the four coherent reception units.

Any transmission unit may include components other than the transmitter processor—for example—a laser of the coherent transmitter, a modulator and the like.

Any reception unit may include components other than the receiver processor—for example—a controllable laser, a demodulator and the like.

The pluggable module 372 also include electrical connectors 376 for interfacing with other components of the network element 370. The electrical connectors 376 may exchange signals with the processor for four Tx and four RX channels 380.

FIGS. 6 and 7 illustrate pluggable modules. The pluggable modules can be accessible to a user and can be replaced by a user. Nevertheless—the pluggable modules may not be accessible to the user and may not be replaced by the user. Furthermore—any of the coherent receiver illustrated above may be included in a non-pluggable network module.

The pluggable modules of FIGS. 6 and 7 enable a user to store a limited number of types (for example one or two) of pluggable modules.

Figure 8:
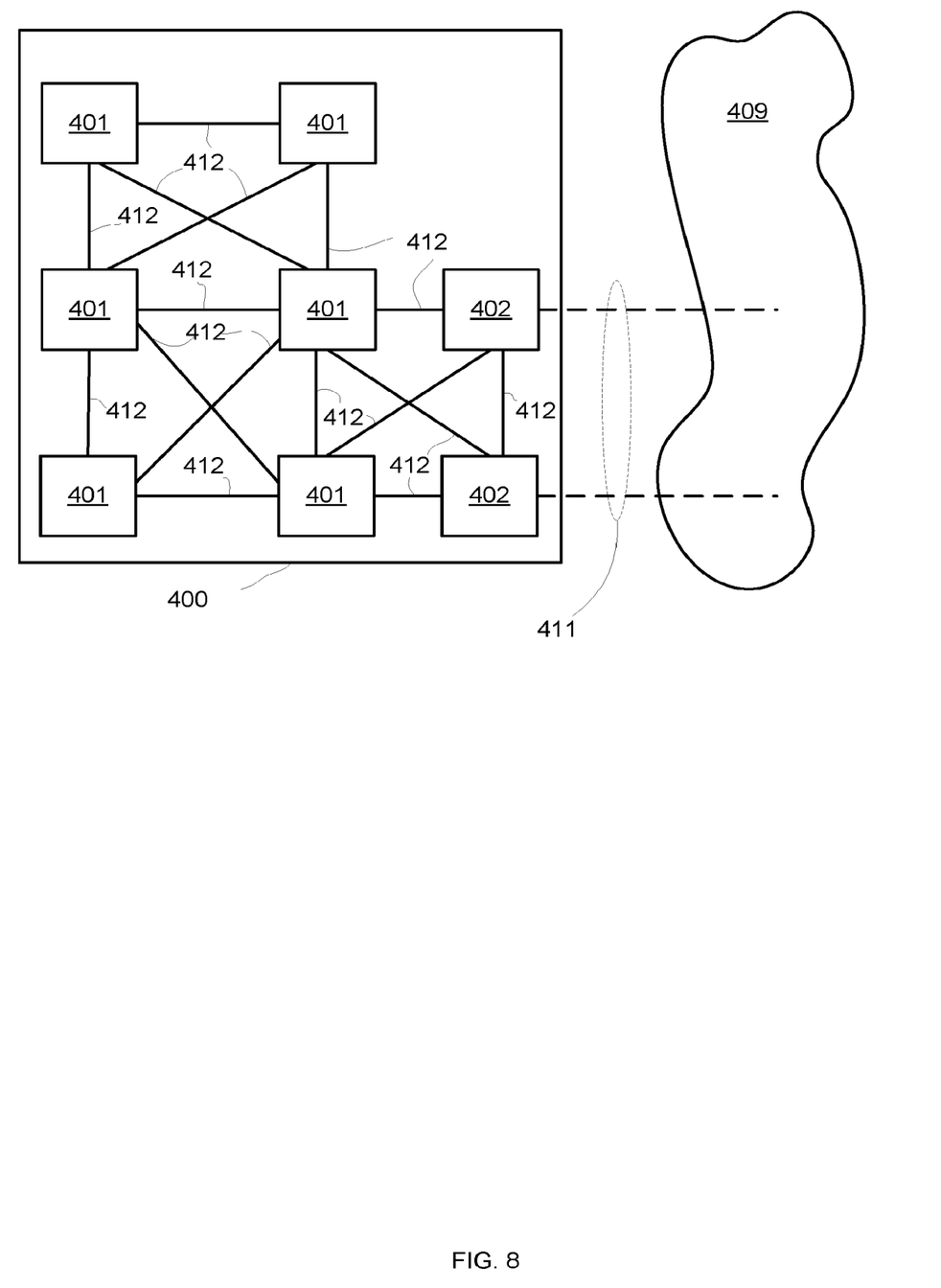
FIG. 8 is an example of a data center and its environment.

FIG. 8 is an example of data center 400 and its environment.

Data center 400 is coupled to a network 409 and may exchange traffic with other data centers and/or with other computerized systems over communication channels 411. Network elements 401 of the data center (including edge network elements 402) may communicate with each other using intra data communication channels 412.

The term "and/or" means additionally or alternatively. Thus—A and/or B may be only A, only B or a combination of A and B.

Any value or number referred to in the application may be a non-limiting example of such a value of number. For example—the number of demodulators per coherent receiver may differ from two, the number of RX units per pluggable modulator may differ from four.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A non-transitory computer readable medium for intra data center optical communication, the non-transitory computer readable medium stores instructions for:
   receiving an optical input signal by a coherent optical receiver of a second unit of a data center; wherein each input optical signal represents a transmitted optical signal that was transmitted by a coherent transmitter of a first unit of the data center; wherein the transmitted optical signal is generated by modulating a transmitter laser signal that is outputted from a laser of the coherent transmitter;
   generating, by a controllable laser of the coherent optical receiver, a reference signal; wherein a frequency of the reference signal is controlled by a processor of the coherent optical receiver, while avoiding from requesting an absolute output frequency of the controllable laser, and independently from a control of the laser of the coherent transmitter;
   estimating the frequency of the reference signal by applying a Viterbi-Viterbi fourth power estimator algorithm; and
   recovering data embedded in the optical input signal; wherein the recovering of the data comprises optically processing the reference signal and the optical input signal.

2. The non-transitory computer readable medium according to claim 1, that stores instructions for controlling a temperature of the controllable laser.

3. A network element, the network element comprises a coherent optical receiver, wherein the coherent optical receiver comprises:
   an input that is configured to receive an optical input signal by a coherent optical receiver of a second unit of a data center; wherein the input optical
   signal represents a transmitted optical signal that was transmitted by a coherent transmitter of the data center; wherein the transmitted optical signal is generated by modulating a transmitter laser signal that is outputted from a laser of the coherent transmitter;
   a processor;
   a controllable laser that is configured to generate a reference signal;
   a processor that is configured to control a frequency of the reference signal independently from a control of the laser of the coherent transmitter;
   optical circuitry that is configured to optically process the reference signal and the optical input signal; and
   optical to digital conversion circuitry;
   wherein the processor is also configured to recover data embedded in the optical input signal;
   wherein the controllable laser has a frequency range that is (ii) narrower than a frequency range of a tunable laser, and (ii) limited to a frequency range of a single coarse wavelength division multiplexing (CWDM) link.

4. The network element according to claim 3, wherein the controllable laser has a lower stability over temperature changes than a tunable laser.

5. The network element according to claim 3, wherein the controllable laser has a lower stability over temperature changes than the a tunable laser.

6. The network element according to claim 3, wherein the processor is configured to control a temperature of the controllable laser.

7. A network element, the network element comprises a coherent optical receiver, wherein the coherent optical receiver comprises:
   an input that is configured to receive an optical input signal by a coherent optical receiver of a second unit of a data center; wherein the input optical
   signal represents a transmitted optical signal that was transmitted by a coherent transmitter of the data center; wherein the transmitted optical signal is generated by modulating a transmitter laser signal that is outputted from a laser of the coherent transmitter;
   a processor;
   a controllable laser that is configured to generate a reference signal;
   a processor that is configured to control a frequency of the reference signal independently from a control of the laser of the coherent transmitter;
   optical circuitry that is configured to optically process the reference signal and the optical input signal; and
   optical to digital conversion circuitry;
   wherein the processor is also configured to recover data embedded in the optical input signal;
   wherein the processor is configured to control the frequency of the reference signal while avoiding from requesting an absolute output frequency of the controllable laser.

* * * * *